United States Patent [19]

Noguchi

[11] Patent Number: 4,977,556
[45] Date of Patent: Dec. 11, 1990

[54] PACKET SWITCHING SYSTEM FOR A DISTRIBUTED PROCESSING ISDN SWITCH

[75] Inventor: Akira Noguchi, Tokyo, Japan
[73] Assignee: NEC Corporation, Japan
[21] Appl. No.: 377,633
[22] Filed: Jul. 10, 1989
[30] Foreign Application Priority Data Jul. 11, 1988 [JP] Japan ................. 63-170972
Jul. 29, 1988 [JP] Japan ................. 63-188310

[51] Int. Cl.⁵ .................. H04J 3/02; H04J 3/26
[52] U.S. Cl. ......................... 370/60; 370/94.1;
                                                370/85.11
[58] Field of Search ........... 370/60, 85.11, 60.1,
                                      370/110.1, 94.1, 85.1

[56]    References Cited
        U.S. PATENT DOCUMENTS 4,535,448  8/1985  Baxter et al. ............ 370/85.11
4,737,950  4/1988  Fechalos ................... 370/60
4,755,986  7/1988  Hirata ....................... 370/60
4,771,425  9/1988  Baran et al. ............ 370/110.1
4,827,473  5/1989  Tsuzuki et al. ............. 370/60
4,851,997  7/1989  Tatara ...................... 364/284.4

Primary Examiner—Douglas W. Olms
Assistant Examiner—Min Jung
Attorney, Agent, or Firm—Leydig, Voit & Mayer

[57]    ABSTRACT

A packet switching system for a distributed processing ISDN (Integrated Services Digital Network) has terminal line control units, trunk line control units, data packet assembly/disassembly control units, voice packet assembly/disassembly control units, a call processing control unit, and an internal bus device for allowing data or voice to be transferred among the various control units. The data packet and voice packet assembly/disassembly control units are shared by all of the control units. The internal bus device is implemented as a packet bus for transferring packetized data or voice, a message bus for transferring non-packetized data or voice, and a call processing bus for transferring call processing data.

2 Claims, 27 Drawing Sheets

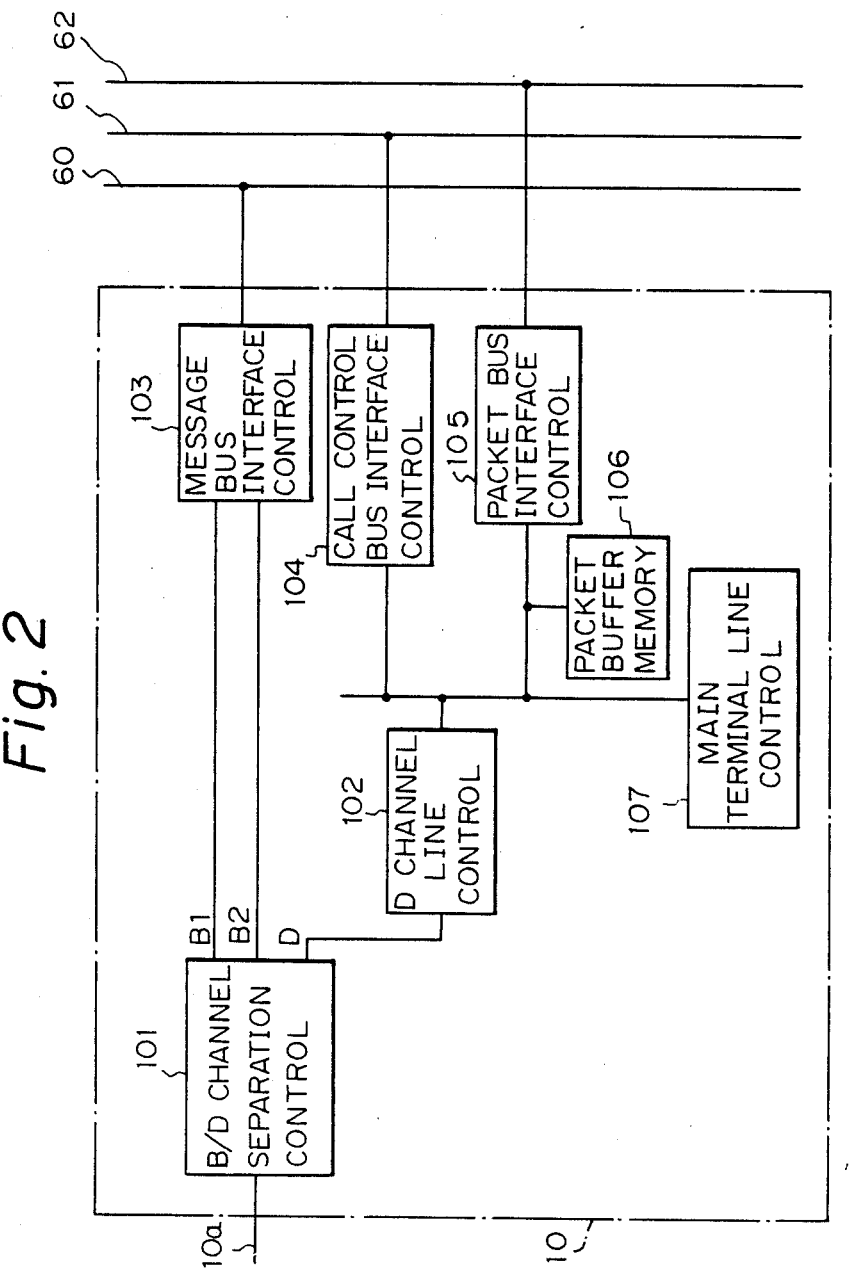

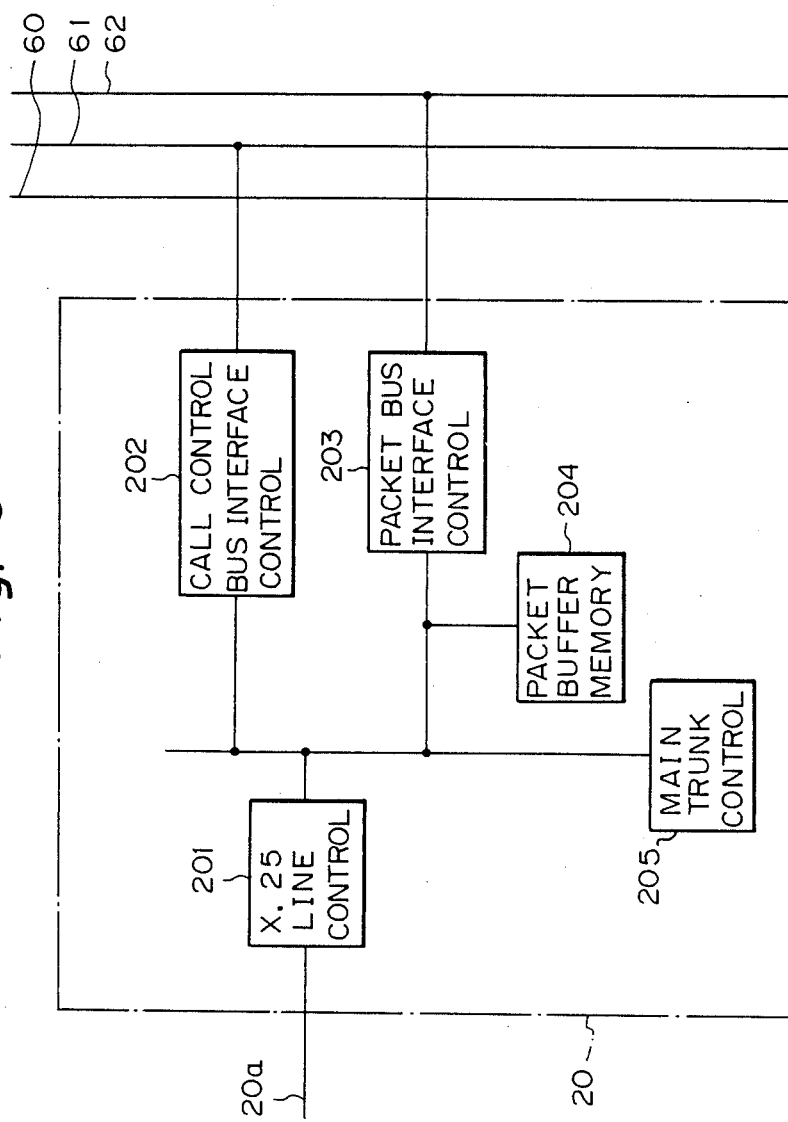

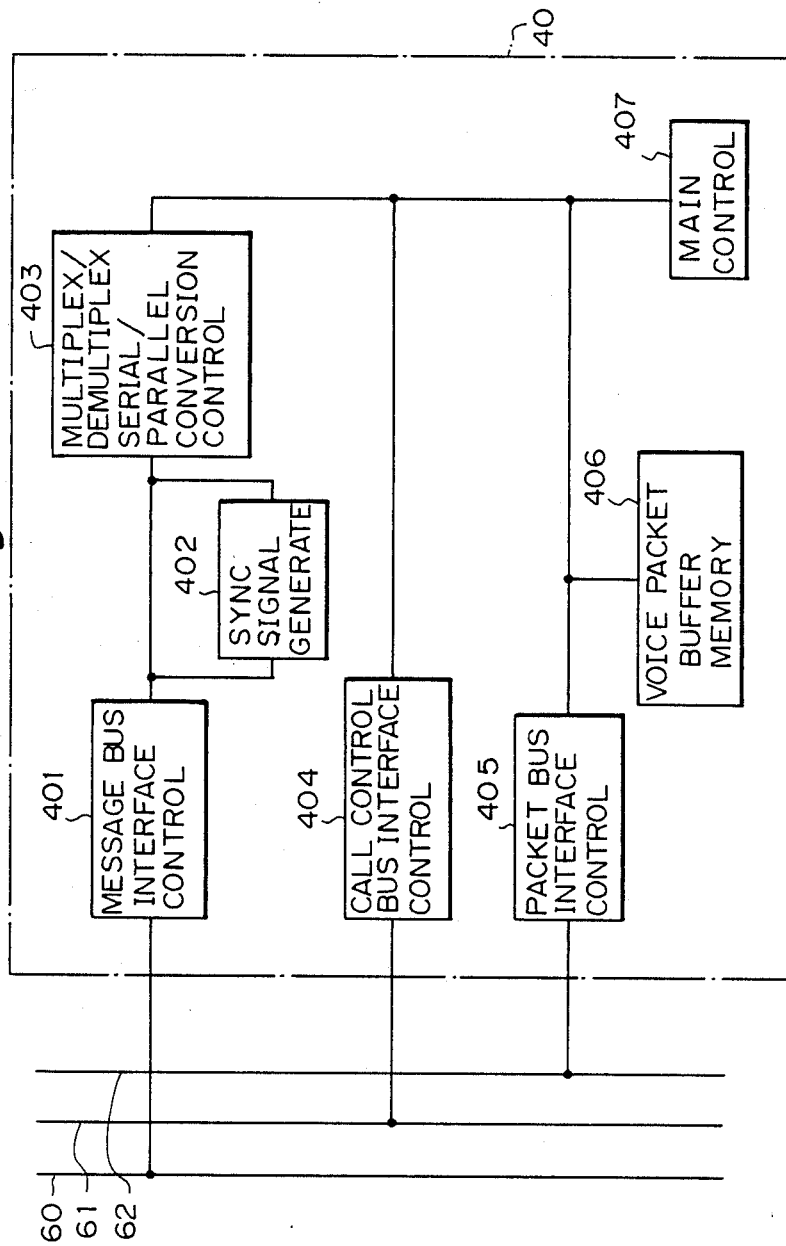

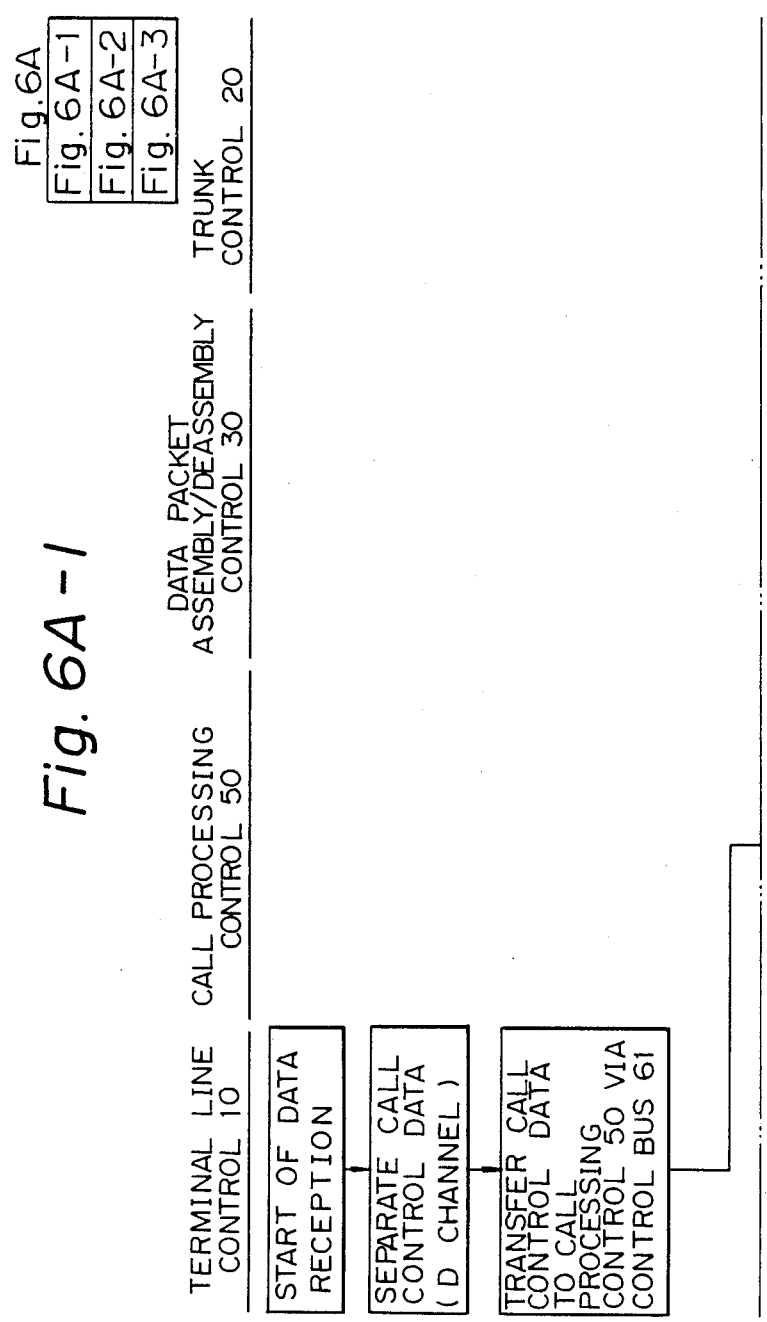

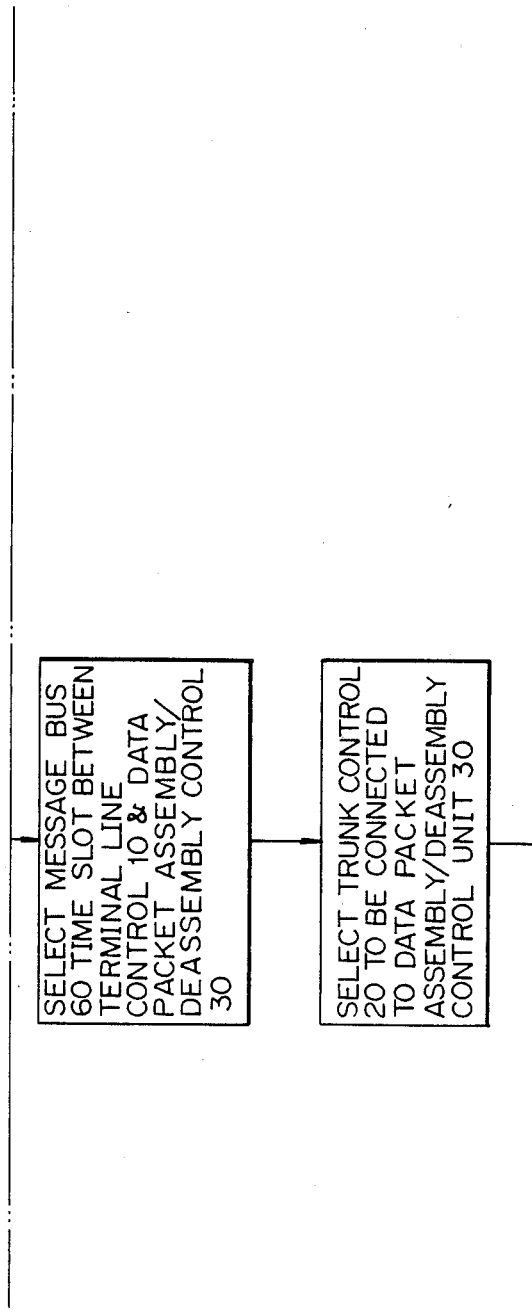

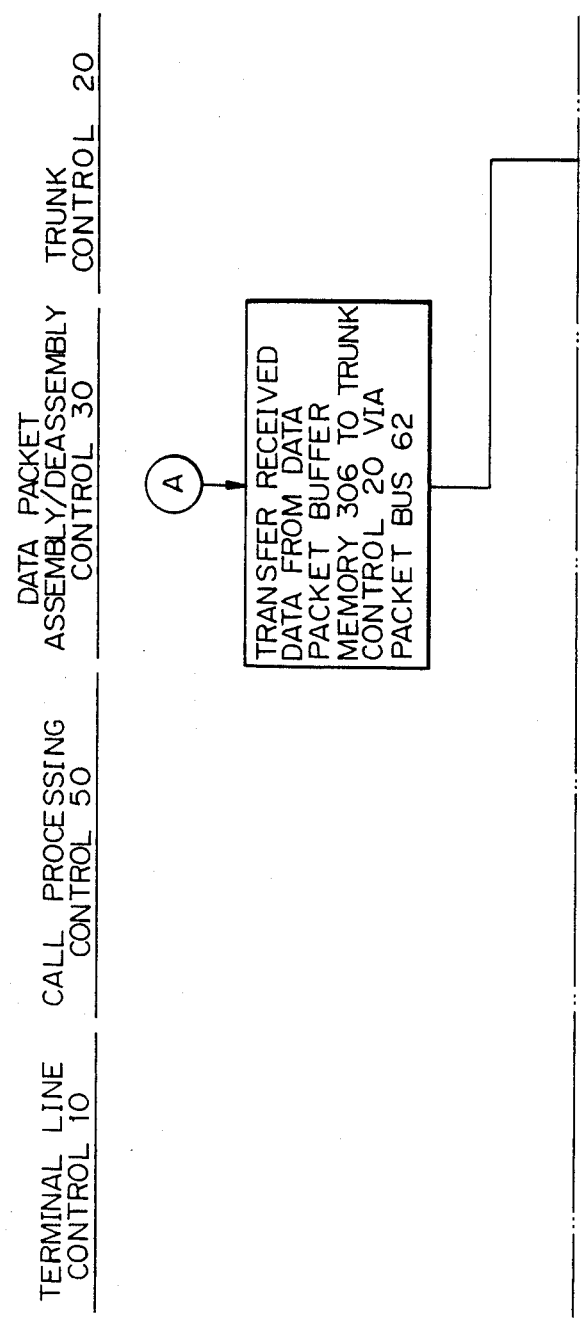

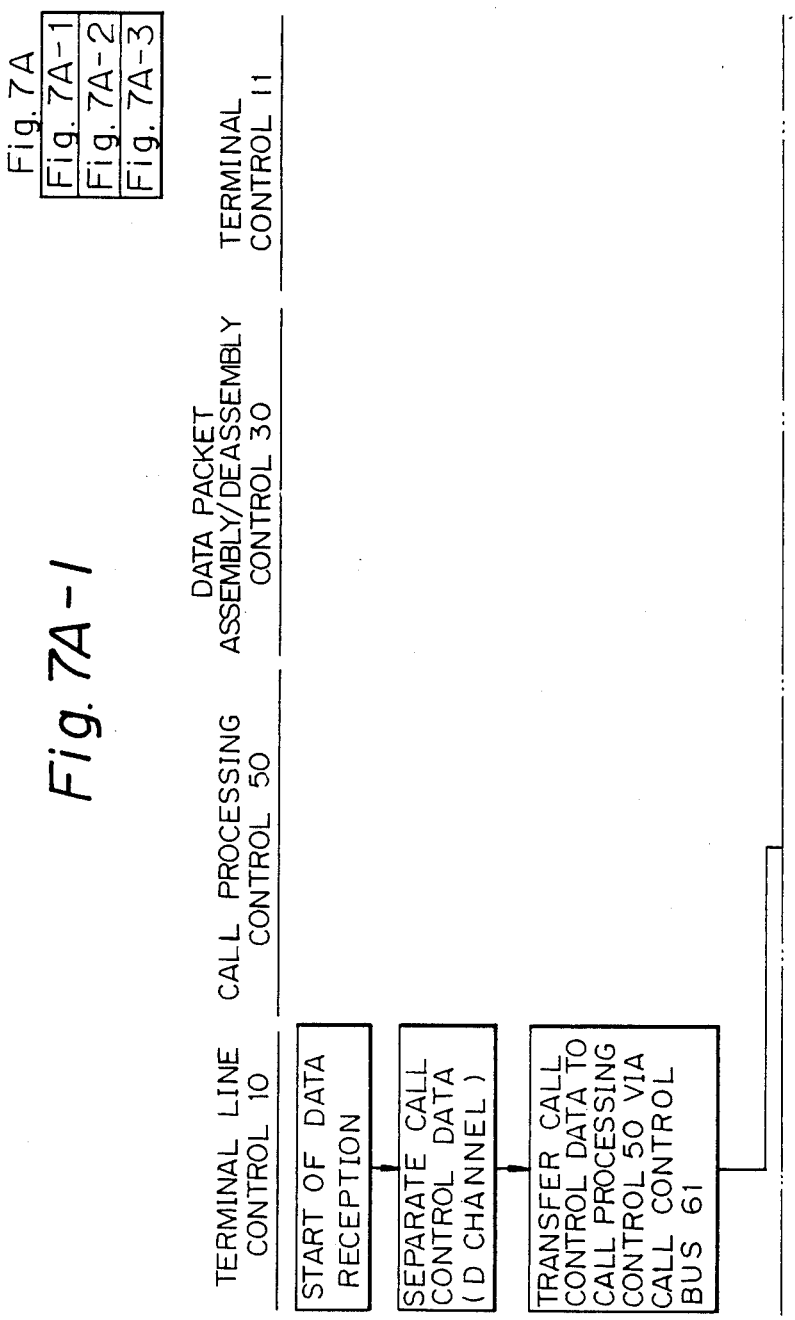

| TERMINAL LINE CONTROL 10 | CALL PROCESSING CONTROL 50 | DATA PACKET ASSEMBLY/DEASSEMBLY CONTROL 30 | TERMINAL CONTROL 11 |
|---|---|---|---|
| | | (B) → ADD PACKET HEADERS TO RECEIVED DATA | CONNECT TERMINAL LINE (B CHANNEL) 10a TO DATA PACKET ASSEMBLY/ DEASSEMBLY CONTROL 30 VIA MESSAGE BUS 60 |

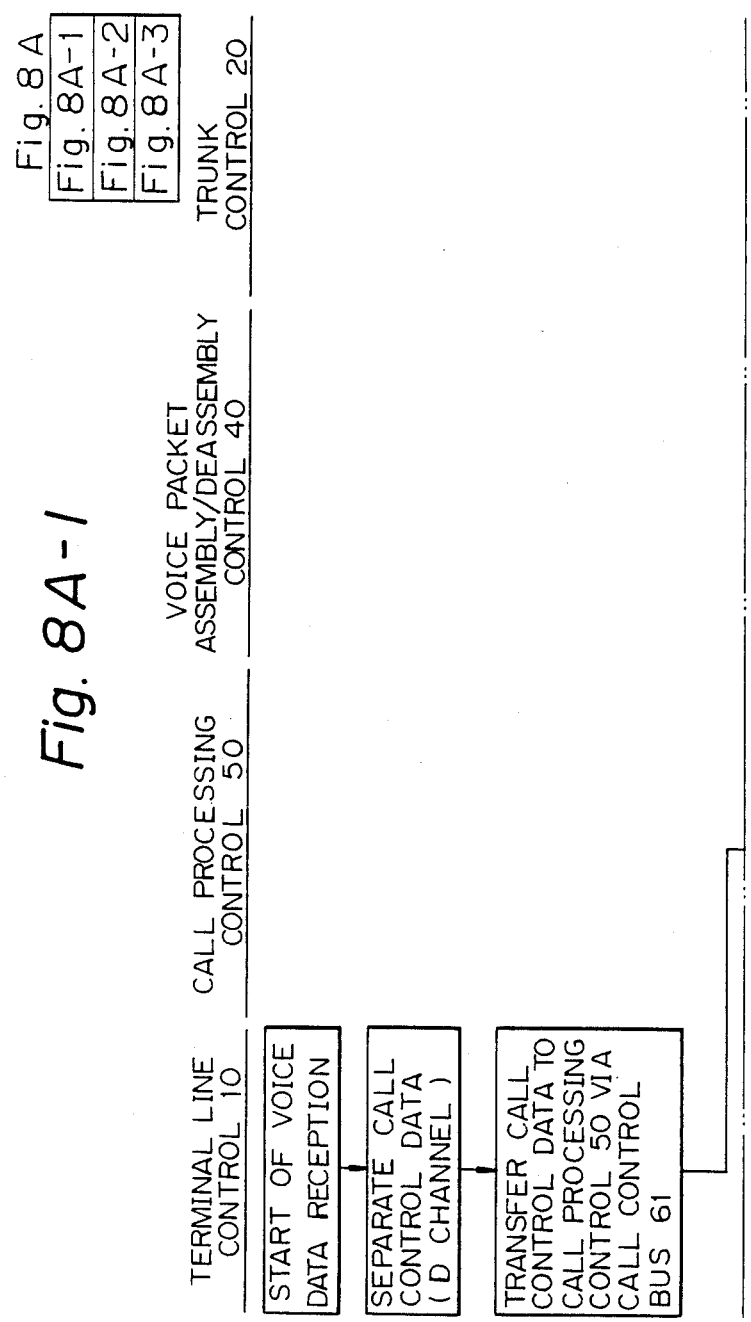

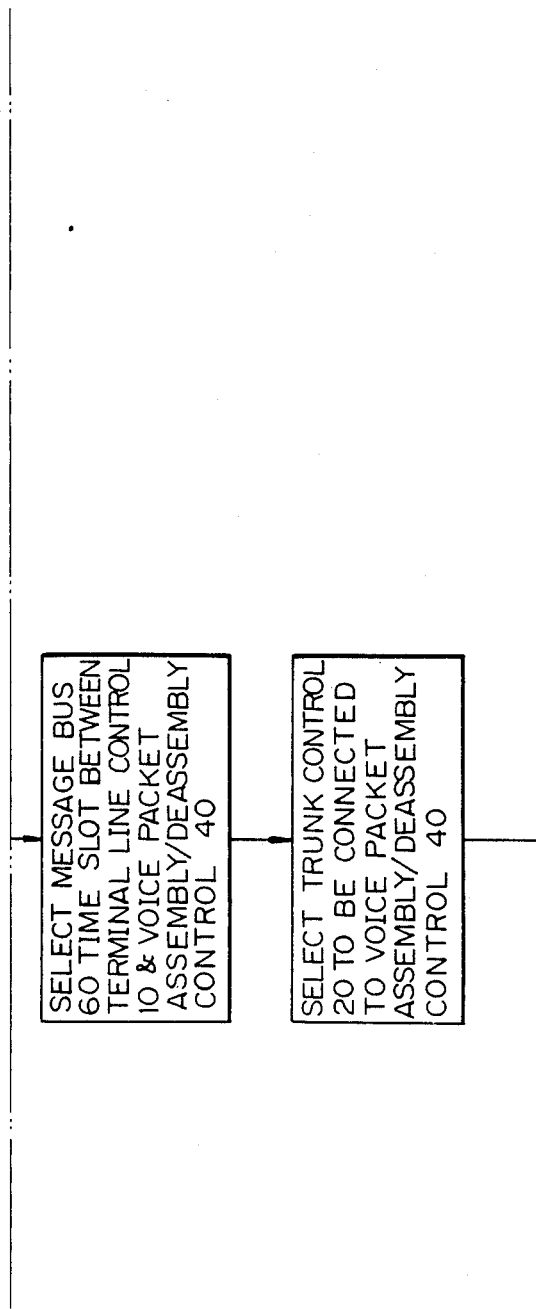

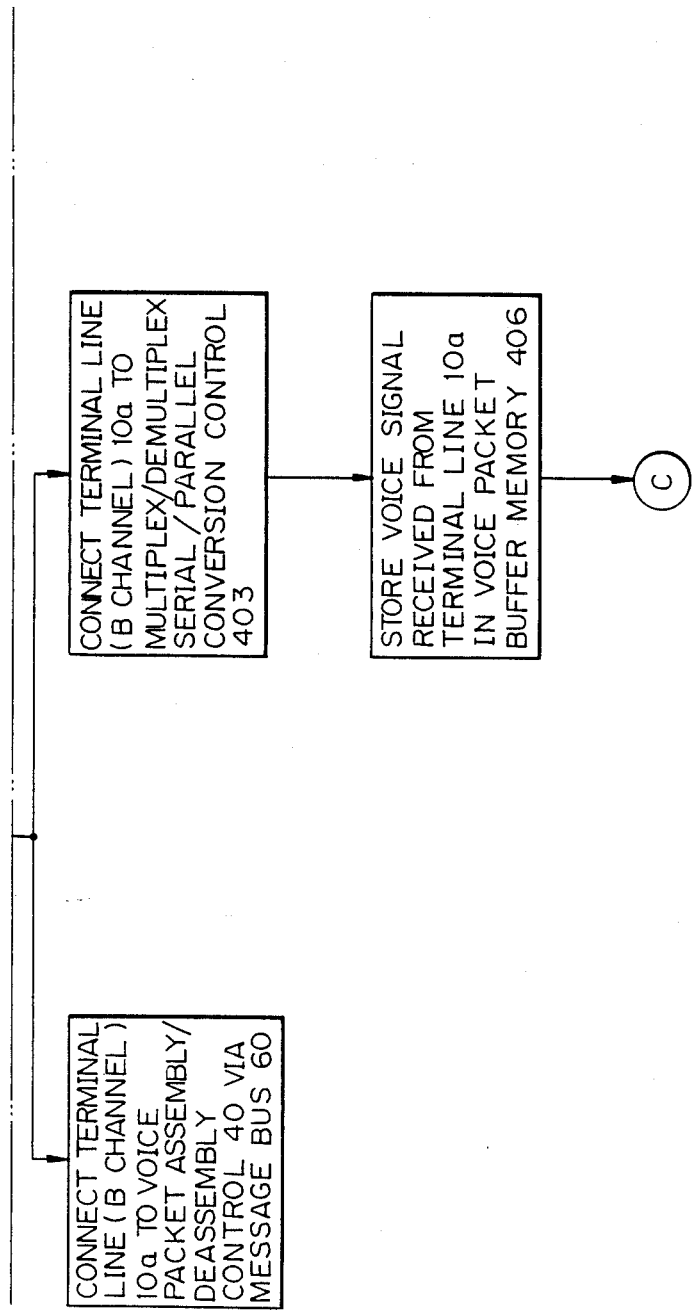

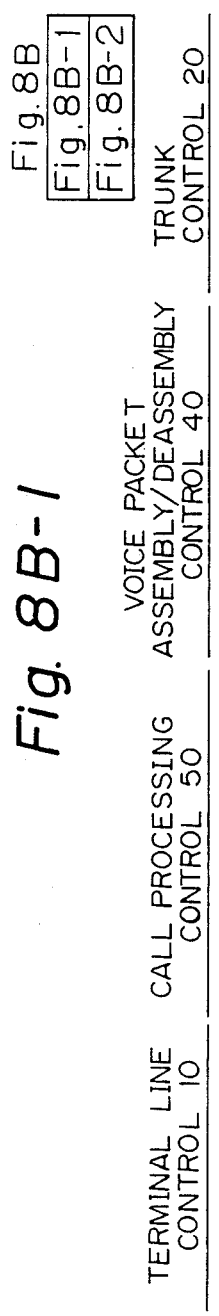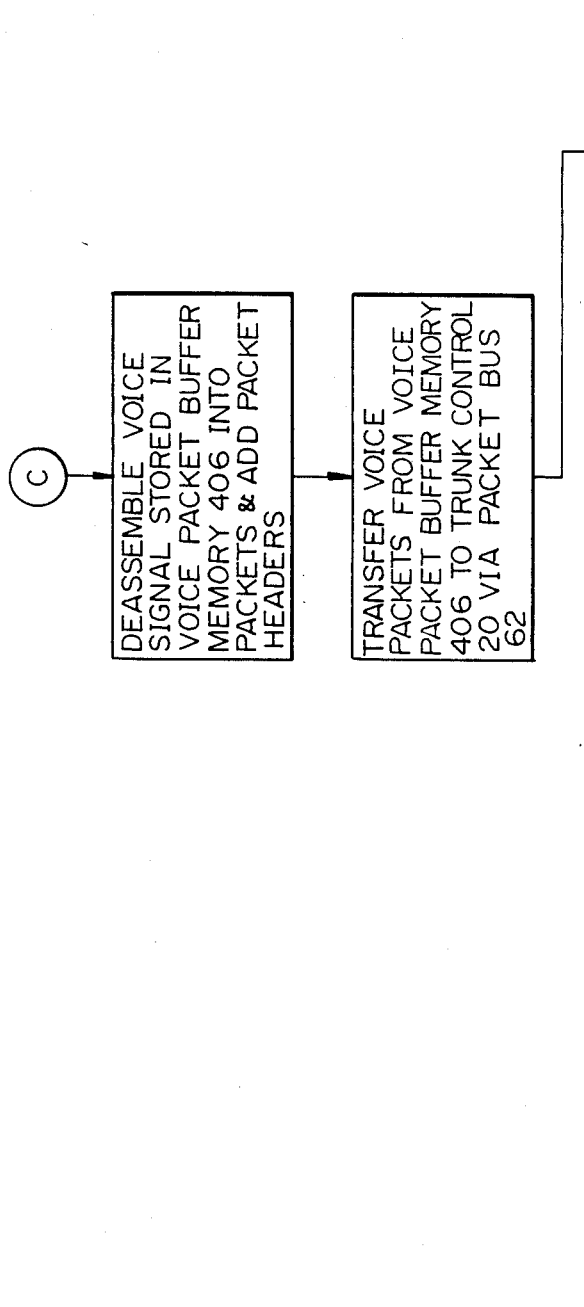

Fig. 9A-1

| Fig. 9A |
|---|
| Fig. 9A-1 |
| Fig. 9A-2 |

| TERMINAL LINE CONTROL 10 | CALL PROCESSING CONTROL 50 | VOICE PACKET ASSEMBLY/DEASSEMBLY CONTROL 40 | TRUNK CONTROL 20 |
|---|---|---|---|
| | | | START OF VOICE PACKET RECEPTION |
| | | | CAUSE X.25 LINE CONTROL 201 TO STORE VOICE PACKETS RECEIVED FROM TRUNK 20a IN PACKET BUFFER MEMORY 204 |
| | | | INFORM CALL PROCESSING CONTROL 50 OF RECEPTION OF VOICE PACKETS VIA CALL CONTROL BUS 61 |

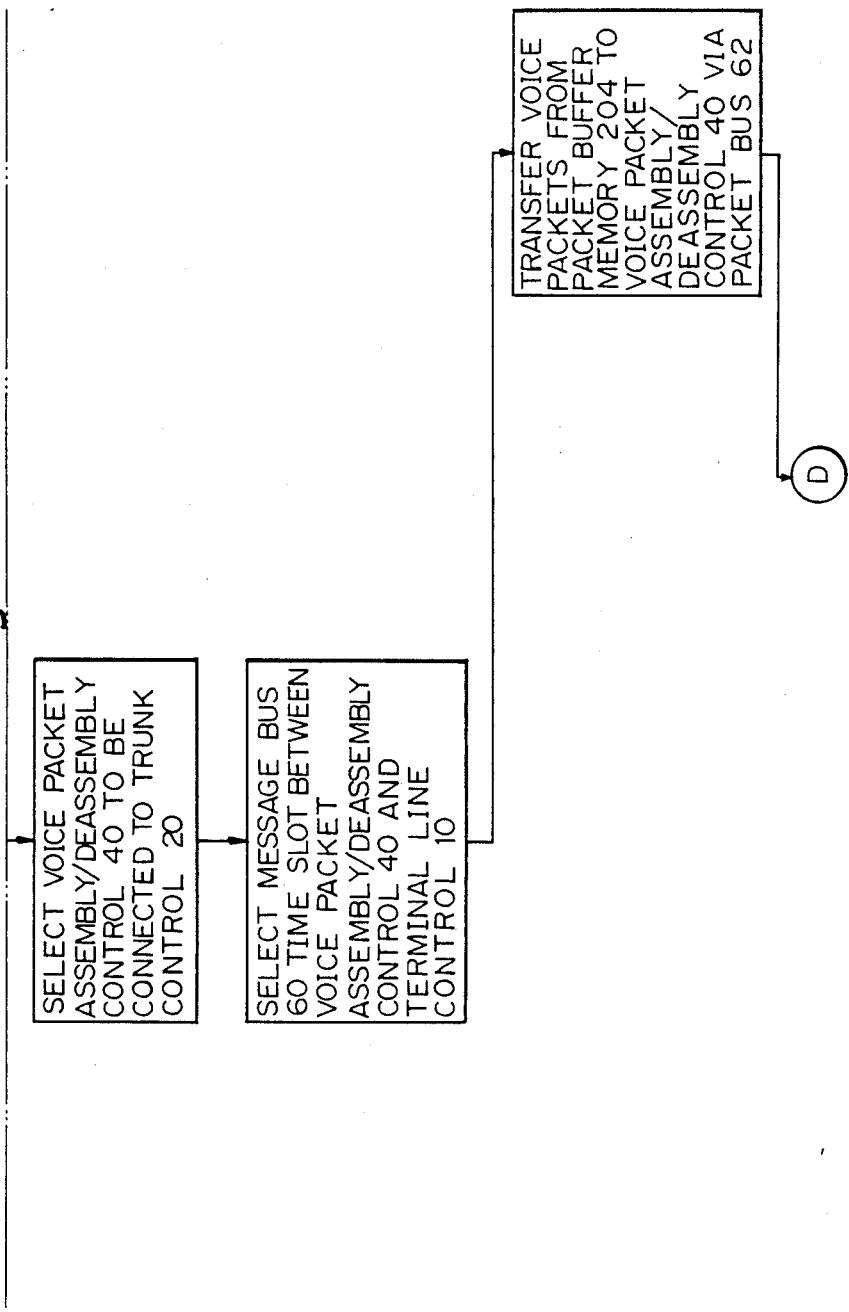

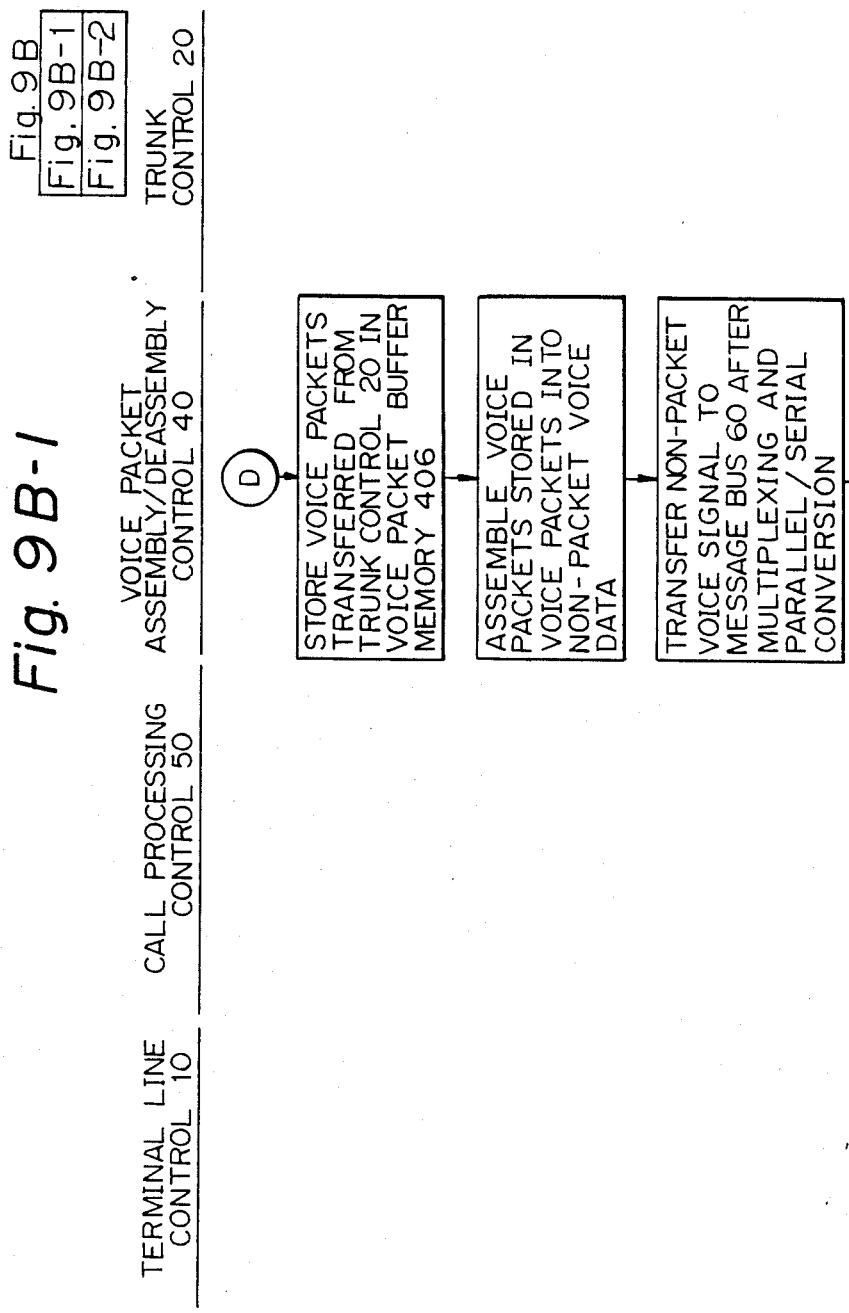

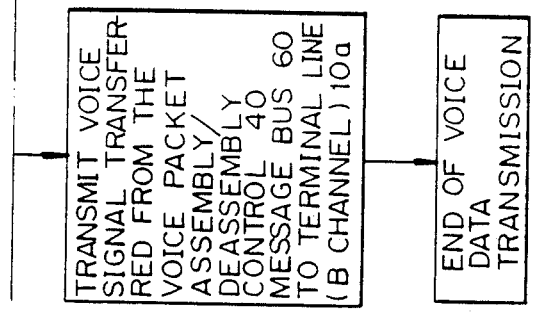

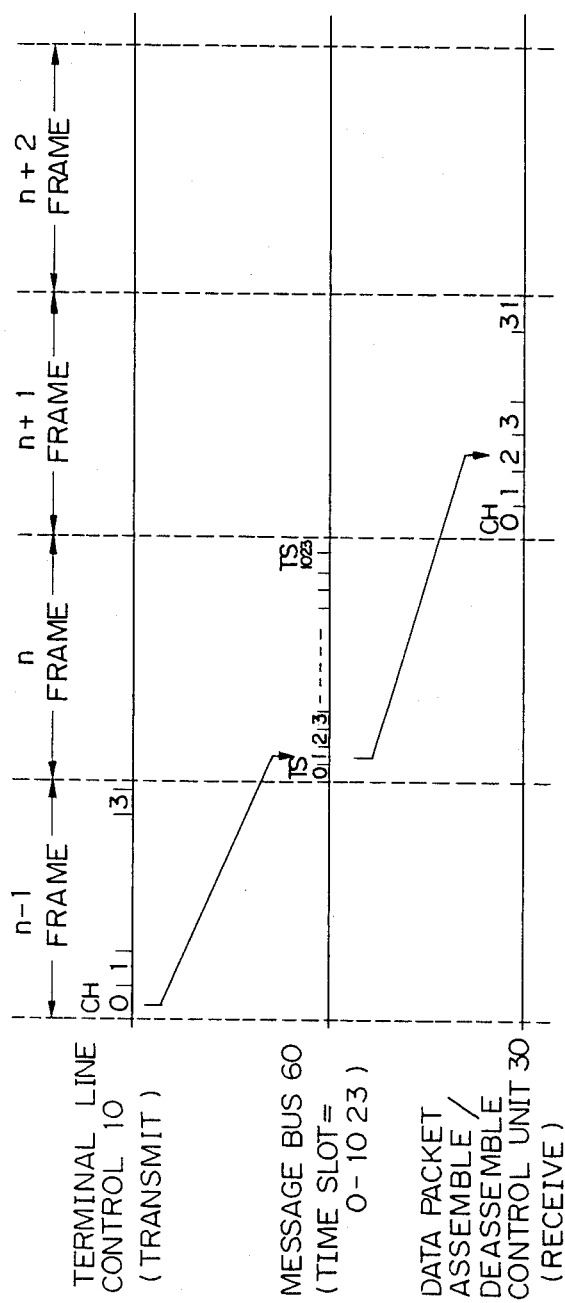

PACKET SWITCHING SYSTEM FOR A DISTRIBUTED PROCESSING ISDN SWITCH

BACKGROUND OF THE INVENTION

The present invention relates to a distributed processing ISDN (Integrated Services Digital Network) switch. More particularly, the present invention relates to a packet switching system for executing multimedia packet switching with a distributed processing ISDN switch by implementing shared use of packet assembly/disassembly control units within the switch with respect to individual terminal lines, assigning packet assembly/disassembly control units to each of different types of media, and installing in the switch a message bus for transferring non-packet data and a packet bus for transferring packets.

An ISDN architecture is an implementation for promoting versatile and advanced communications services. A current trend in the ISDN art is toward a distributed processing ISDN switch having various control functions which are distributed to a plurality of processors in place of a traditional functionally centralized type of ISDN switch. Elaborated to distribute the functions and loads, a distributed processing ISDN switch features various merits such as feasibility to modular applications, building block capability, and high reliability. A packet switching system is capable of processing multiple media collectively, and there is an increasing demand for such a switching system in the ISDN switches field. When packet switching is adopted for an ISDN switch, highly efficient use of the lines and, therefore, an extremely effective network can be constructed if packets are transferred over trunks.

A prior art distributed processing ISDN switch has terminal line control units, each being associated with respective one of terminal lines, for effecting B channel and D channel line control. Trunk control units are assigned one-to-one to the trunks to execute X.25 protocol line control. The terminal line control units and trunk control units are interconnected by a packet transfer bus. A call control section for performing call processing is connected to the line control units by a call control bus which is adapted to transfer call control data. Each of the terminal line control units is provided with a packet assembly/disassembly control unit. All the information in the form of data or voice, for example, which come in over any of the lines is assembled or disassembled by the exclusive terminal line control unit assigned to that line, the resulting packets being transferred over the packet bus. The prior art ISDN switch is, for example, proposed in U.S. Pat. No. 4,827,473.

A drawback with the prior art ISDN switch described above is that packet assembly/disassembly control units have to be assigned one-to-one to the terminal lines. Further, as the number of media to be handled by the switch increases, packet assembly/disassembly control units, each being capable of dealing with a particular type of media, have to be installed on a terminal line basis. Then, a voice packet assembly/disassembly control unit would exist even in, for example, a terminal line control unit which does not accommodate a terminal having a voice communications capability, resulting in a redundant functional distribution. On the other hand, when data are interchanged without being accompanied by voice, the voice packet assembly/disassembly control unit is not used at all, resulting in the functional utilization efficiency in the switch being low.

Hence, a packet switching system of the type installing packet assembly/disassembly control units in individual terminal line control units of a switch to assign the whole packet assembly/disassembly processing operations to the terminal line control units has a problem left unsolved as to how to distribute the packet assembly/disassembly processing functions within the switch. That is, distributing the packet assembling/disassembly functions to the terminal line control units is not desirable.

As discussed above, the packet assembly/disassembly control units have to be installed in a switch in association with different types of media because the content of packet assembly/disassembly processing differs from one media to another. Nevertheless, what is required of the packet switching system for a distributed ISDN switch is to enhance efficient use of packet assembly/disassembly control units without installing the packet assembly/disassembly control units in the individual terminal line control units for accommodating various types of media.

SUMMARY OF THE INVENTION

It is therefore an object of the present invention to provide a packet switching system for a distributed processing ISDN switch which reduces the redundancy of functional distribution in the switch to thereby promote efficient use of packet assembly/disassembly control units.

It is another object of the present invention to provide a packet switching system for a distributed processing ISDN switch which implements packet assembly/disassembly processing matching the characteristics of different types of media.

It is yet another object of the present invention to provide a packet switching system for a distributed processing ISDN switch which reduces the period of time necessary for non-packet data switching and the transmission delay time.

A packet switching system for a distributed processing ISDN switch of the present invention comprises a plurality of terminal line control units, each being connected to respective one of ISDN terminals, for controlling a B channel and a D channel, a plurality of trunk control units for performing X.25 protocol control to connect the ISDN switch to another ISDN switch, packet assembly/disassembly control means for assembling and disassembling data to be transmitted to any of the ISDN terminals and data received from any of the ISDN terminals, internal bus means interconnecting the terminal line control units, trunk control units and packet assembly/disassembly control means for causing data to be transferred, a call processing control unit for performing call processing control in response to call processing data which is received from any of the ISDN terminals, and a call processing bus interconnecting the terminal line control units, trunk control units, packet assembly/disassembly control means, and call processing control unit for causing the call control data to be transferred. The packet assembly/disassembly control means is shared by the plurality of terminal line control units.

BRIEF DESCRIPTION OF THE DRAWINGS

The above and other objects, features, and advantages of the present invention will become more apparent from the following detailed description taken with the accompanying drawings in which:

FIG. 2 is a schematic block diagram showing a specific construction of a terminal line control unit included in the switch of FIG. 1;

FIG. 3 is a schematic block diagram showing a specific construction of a trunk control unit also included in the switch;

FIG. 5 is a schematic block diagram showing a specific construction of a voice packet assembly/disassembly control unit also included in the switch;

FIGS. 6A, 6A-1, 6A-2, 6A-3, 6B, 6B-1, and 6B-2 are flowcharts demonstrating data packet transfer processing executed to transfer data packets from a certain terminal line to a certain trunk;

FIGS. 7A, 7A-1, 7A-2, 7A-3, 7B, 7B-1, and 7B-2 are flowcharts indicating data packet transfer processing for transferring data packets from one terminal line to another terminal line;

FIGS. 8A, 8A-1, 8A-2, 8A-3, 8B, 8B-1, and 8B-2 are flowcharts showing voice packet transfer processing for transferring voice packets from one terminal line to a certain trunk;

FIGS. 9A, 9A-1, 9A-2, 9B, 9B-1, and 9B-2 are flowcharts showing voice packet transfer processing for transferring voice packets from one terminal line to another terminal line;

FIG. 10 indicates how a certain terminal line control unit and a certain data packet assembly/disassembly control unit are interconnected by a message bus;

DESCRIPTION OF THE PREFERRED EMBODIMENT

Figure 1:
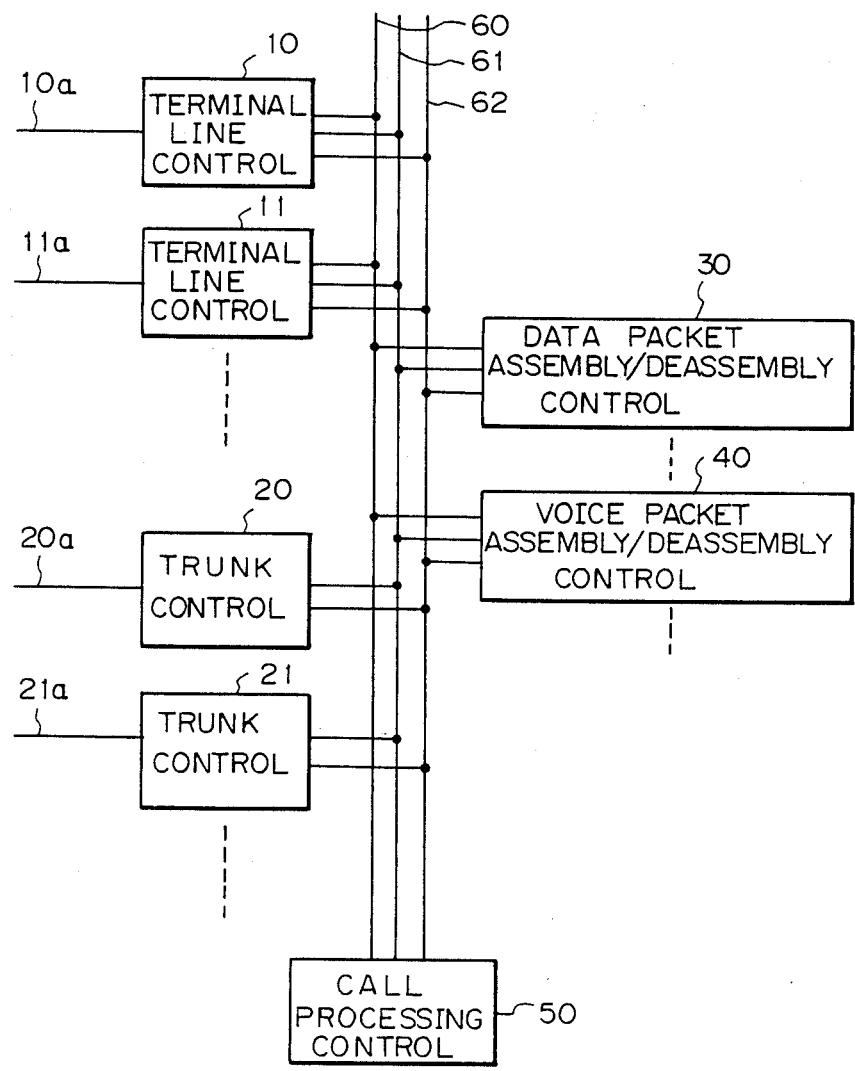
FIG. 1 is a schematic block diagram of a distributed processing ISDN switch representative of a preferred embodiment of the present invention.

Referring to FIG. 1 of the drawings, a distributed processing ISDN switch representative of a preferred embodiment of the present invention is shown and includes a message bus 60, a call control bus 61, and a packet bus 62. These buses 60, 61, and 62 interconnect terminal line control units 10, 11, . . . , trunk control units 20, 21, . . . , data packet assembly/disassembly control units 30, . . . , voice packet assembly/disassembly control units 40, . . . , and a call processing control unit 50. Terminal lines 10a to 11a are connected to the terminal line control units 10 and 11, respectively. Trunks 20a and 21a are connected to the trunk control units 20 and 21, respectively.

A reference will be made to FIGS. 1 through 4, 6A, 6B, and 10 through 12 for describing a data packet switching procedure executed to packetize received data from a terminal (not shown) and then transmit the resulting packets over the trunk 20a, for example.

Figures 3, 6A:
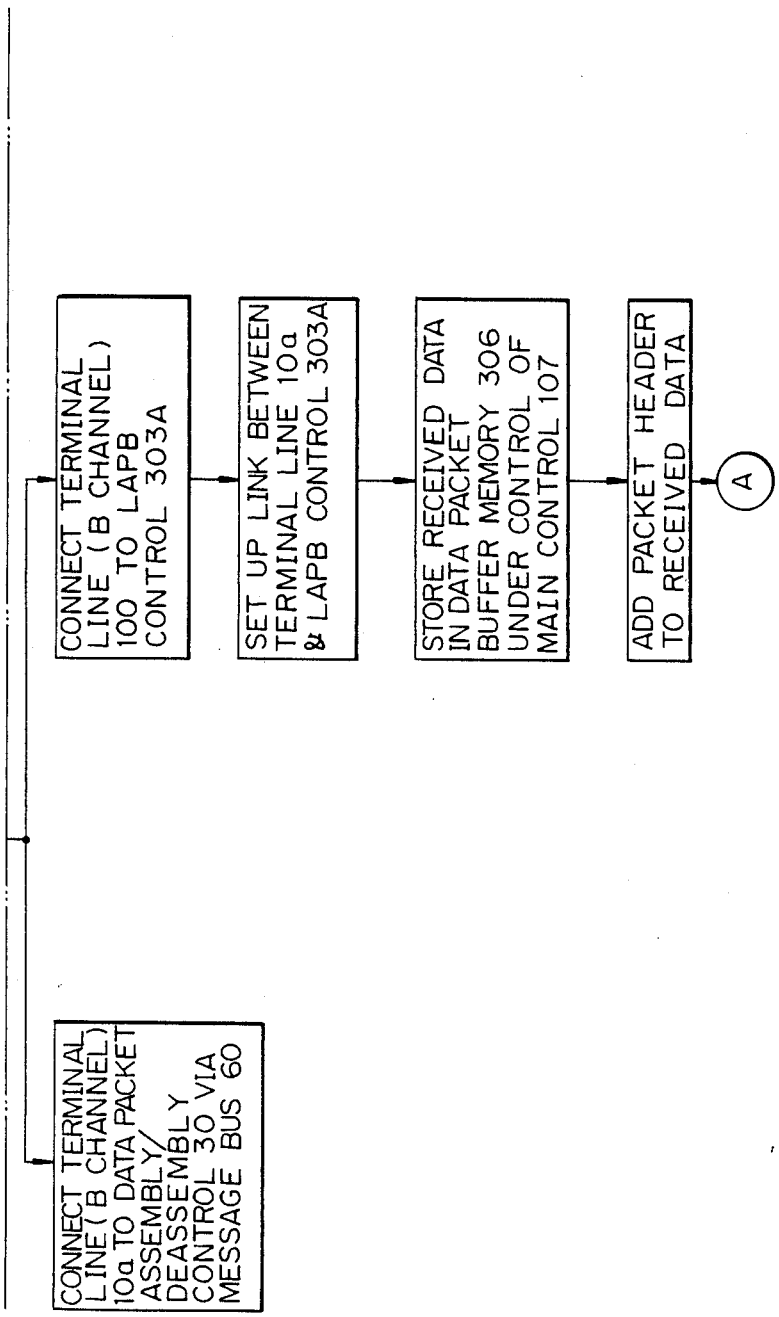
Figures 2, 6B:
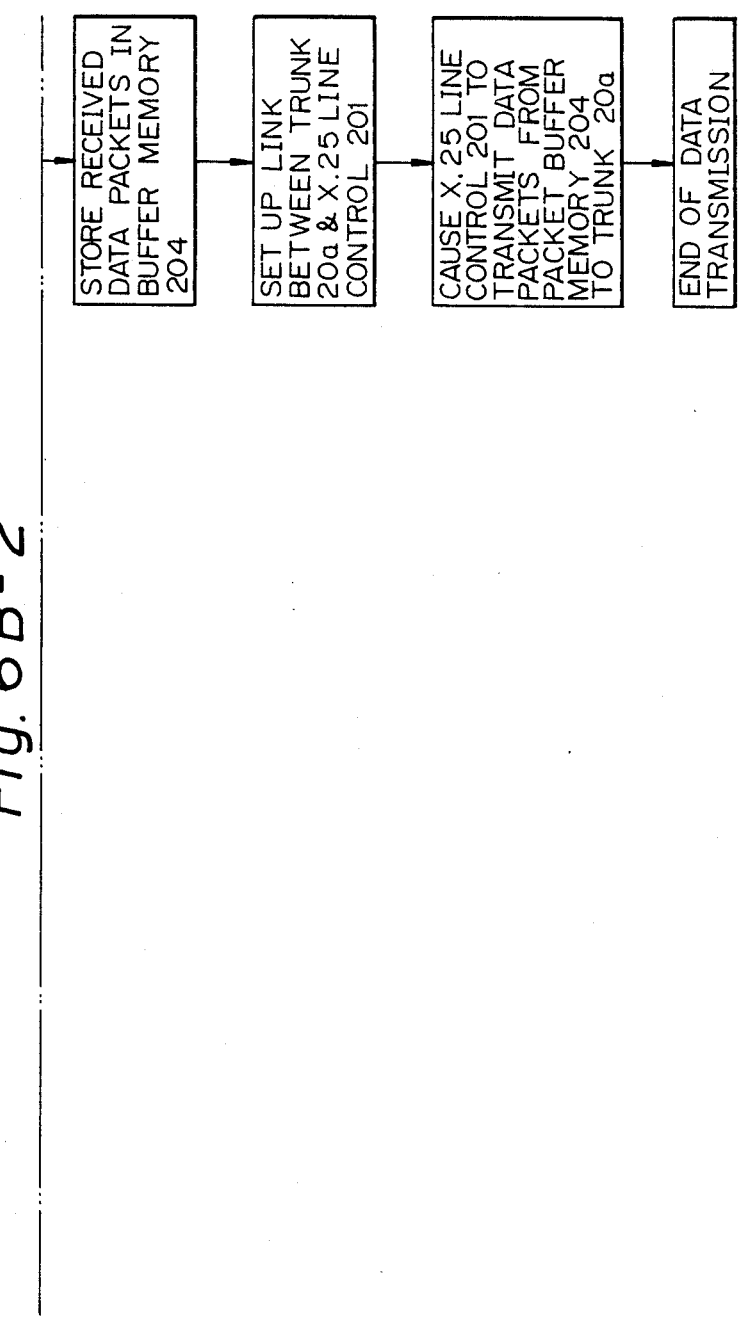

As shown in FIG. 2, when data come in over the terminal line 10a, a B/D channel separation control section 101 included in the terminal line control unit 10 separates D channel call control data from the incoming data. The separated call control data are fed to the call control bus 61 via a D channel line control section 102 and a call control bus interface control section 104 under the control of a main terminal line control section 107. The call control data are propagated through the call control bus 61 to the call processing control section 50. On recognizing the arrival of data at the terminal line control unit 10, the call processing control unit 50 selects a time slot to be used on the message bus 60 in order to interconnect the terminal line control unit 10 and the data packet assembly/disassembly control section 30 with the message bus 60. The control unit 50 informs the control units 10 and 30 of interest of a number representative of the selected time slot via the call control bus 61.

FIG. 10 indicates how the terminal line control unit 10 and the data packet assembly/disassembly control unit 30 are interconnected by the message bus 60. In the figure, it is assumed that channel 0 of the terminal line control unit 10 and channel 2 of the data pack assembly/disassembly control unit 30 are interconnected by time slot #1 of the bus 60. In this case, therefore, the call processing control unit 50 informs the control units 10 and 30 of a time slot number 1, whereby the control units 10 and 30 are interconnected by the time slot #1.

Figure 4:
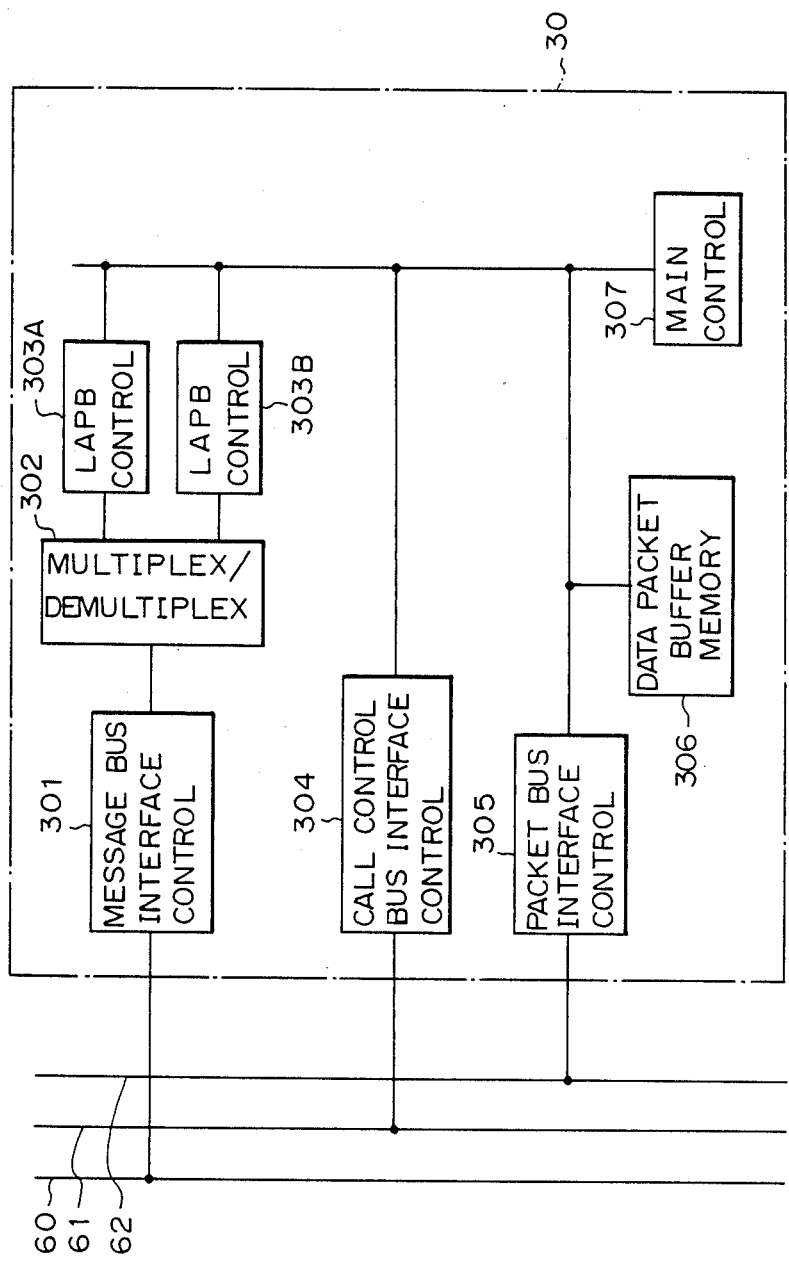
FIG. 4 is a schematic block diagram showing a specific construction of a data packet assembly/disassembly control unit also included in the switch.

The call processing control unit 50 selects the trunk control unit 20 connected to the data packet assembly/disassembly control unit 30 while reporting such selection to the control units 10 and 30 via the call control bus 61. The B/D channel separation control section 101 of the terminal line control unit 10 sends the received B channel data to the message bus 60 via the message bus interface control section 103 (FIG. 2). As shown in FIG. 4, the bus 60 further sends the B channel data to an LAPB control section 303A of the data packet assembly/disassembly control unit 30 by way of a message bus interface control section 301 and a multiplexing and demultiplexing section 302. After a link has been set up between the terminal line 10a and the LAPB control section 303A, the data received over the B channel of the terminal line 10a are stored in a data packet buffer memory 306 under the control of a main control section 307. The received data are assembled into packets, and packet headers are added to the individual data packets. Then, the control unit 30 causes a packet bus interface control section 305 thereof to transfer the data packets having been stored in the memory 306 to the trunk control unit 20 which has been reported by the call processing control unit 50 via the packet bus 62.

Figure 11:
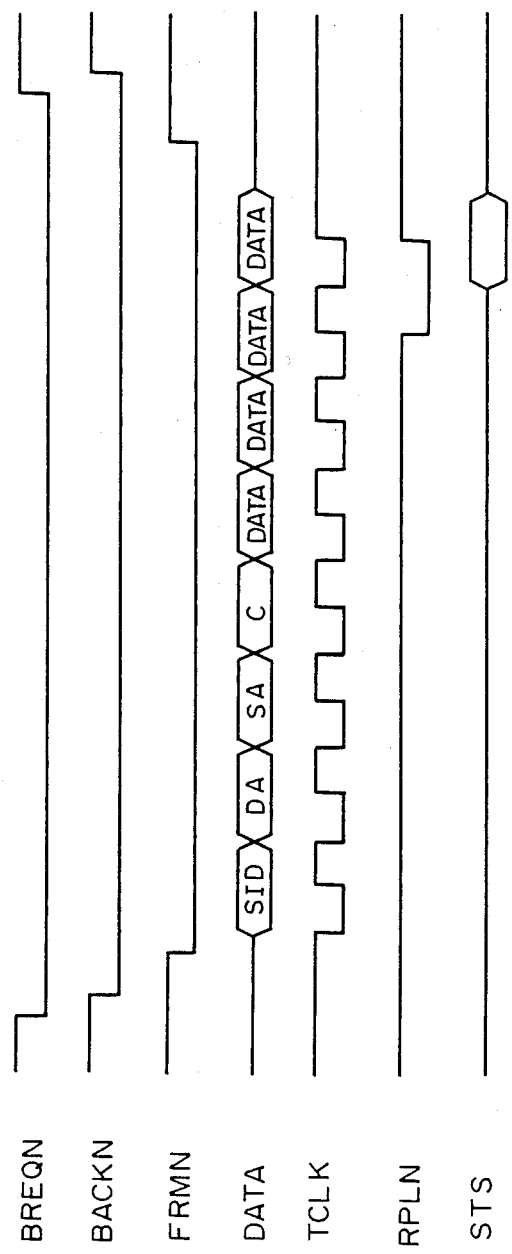
FIG. 11 is a timing chart demonstrating packet transfer over a packet bus.
Figure 12:
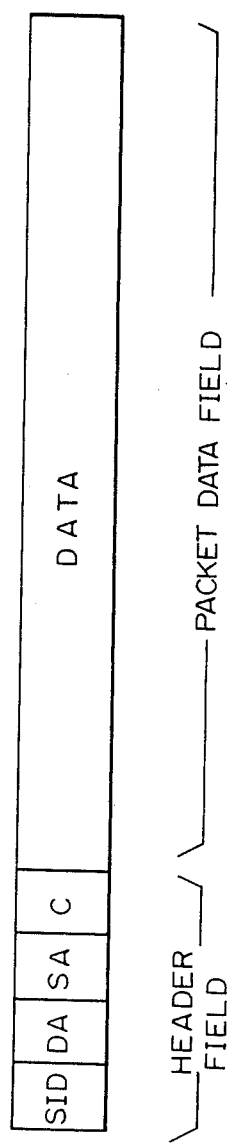
FIG. 12 shows a specific format of a packet which may be transferred over the packet bus.

FIG. 11 is a timing chart useful for understanding the packet transfer which occurs on the packet bus 62. Each packet being transferred on the packet bus 62 has a format shown in FIG. 12. As shown, the packet format is made up of a header field and a packet data field. The header field has an identifier SID representative of the kind of the packet, a destination address DA, a source address SA, and control data C. When a data packet is transferred from the packet assembly/disassembly control unit 30 to the trunk control unit 20, the header field will have a data packet identifier as the identifier SID, an address assigned to the trunk control section 20 as the destination address DA, and an address assigned to the packet assembly/disassembly control unit 30 as the source address SA. Specifically, as the packet assembly/disassembly control unit 30 intending to transmit packets sends a request signal BREQN to a packet bus access control unit, the latter returns an acknowledge signal BACKN to the former. On receiving the signal BACKN, the control unit 30 sends an in-transmission signal FRMN, data DATA, and a clock (TCLK) to the packet bus 62.

Monitoring the flow of packets on the packet bus 62, the trunk control unit 20 receives data DATA together with clock TCKL when packets bearing a destination address identical to the address assigned to the trunk control unit 20 arrive. On completing the reception, the trunk control unit 20 sends status data STS which shows whether the reception has ended in a normal state together with a reply signal RPLN to the packet bus 62. This informs the packet assembly/disassembly control unit 30 which transmitted the packet that the packet was received.

As shown in FIG. 3, the trunk control section 20 stores the data packets coming in over the packet bus 62 in a packet buffer memory 204 via a packet bus interface control section 203. A main trunk control section 205 sets up a link between the trunk 20a and an X.25 line control section 201. Then, the X.25 line control section 201 sends the data packets having been stored in the memory 204 to the trunk 20a.

Figures 2, 7A:
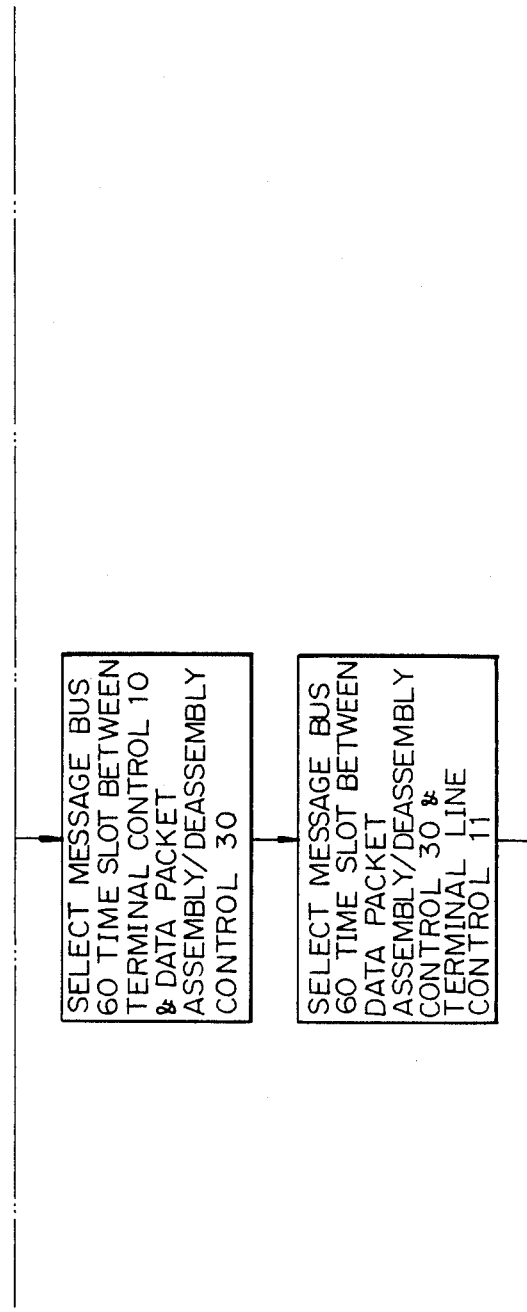
Figures 3, 7A:
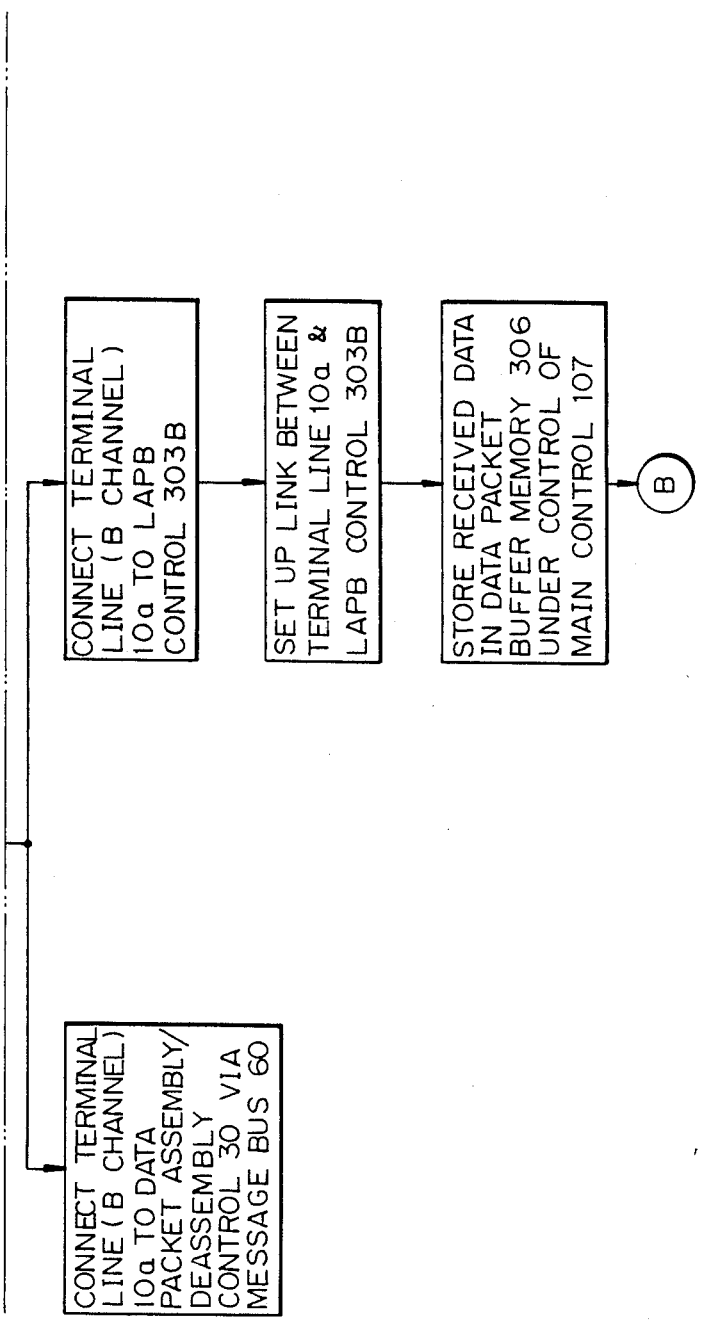
Figures 2, 7B:
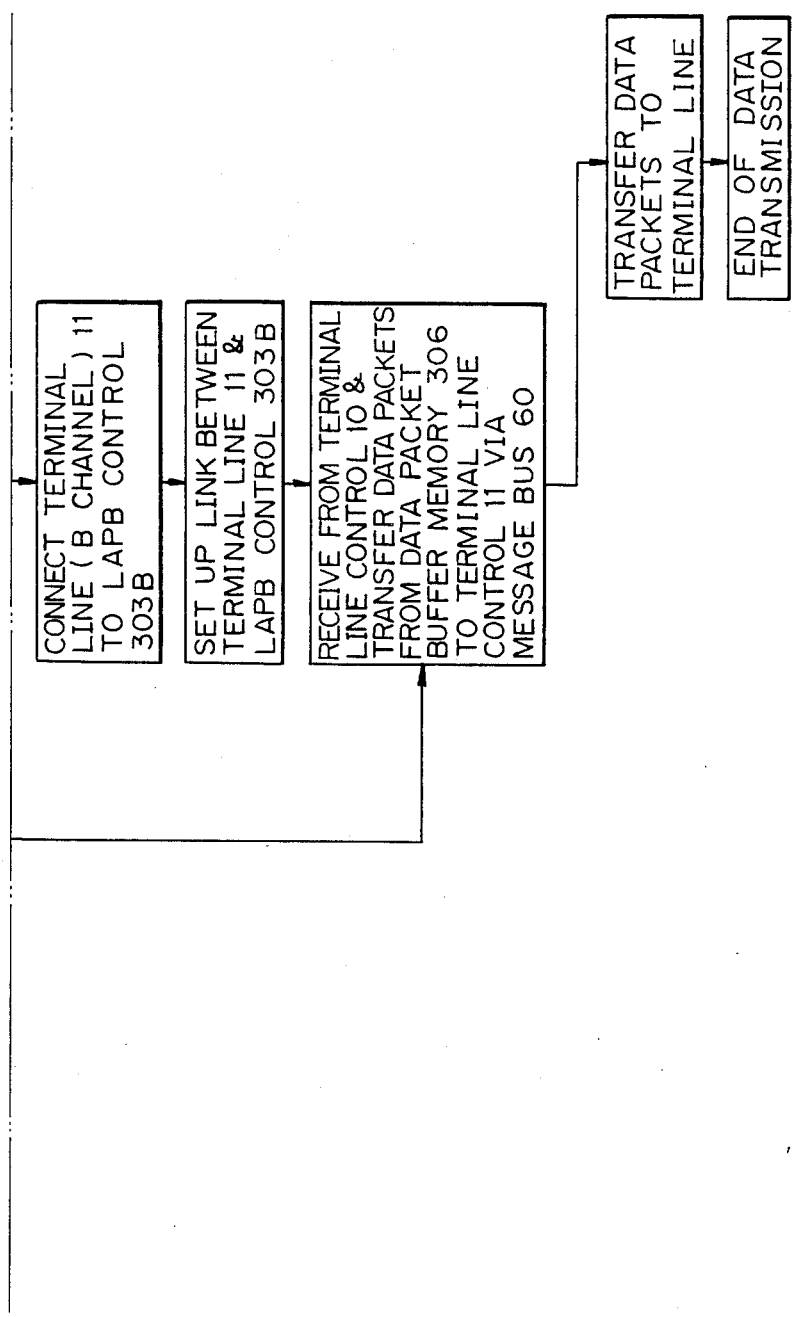

Referring to FIGS. 7A and 7B, there is shown a data packet switching procedure which occurs when data received from a terminal (not shown) over the terminal line 10a are packetized and then transmitted to a terminal (not shown) over the terminal line 11a.

A major difference between the procedure which will be described and the previously discussed procedure pertaining to the terminal line 10a and trunk 20a is as follows. When data received over the terminal line 10a are converted into packets and sent over the trunk 20a as stated previously, the data packets stored in the data packet buffer memory 306 of the packet assembly/disassembly control unit 30 are transferred to the trunk control unit 20 over the packet bus 62. In contrast, when data received over the terminal line 10a are transferred in the form of packets to a terminal (not shown) which is connected to the terminal line 11a, data packets are transferred from the data packet buffer memory 306 to the terminal line control unit 11 which is connected to the control section 30 by the message bus 60 via the multiplexing and demultiplexing section 302. The rest of the procedure is the same as in the previously described case.

Figures 2, 8B:
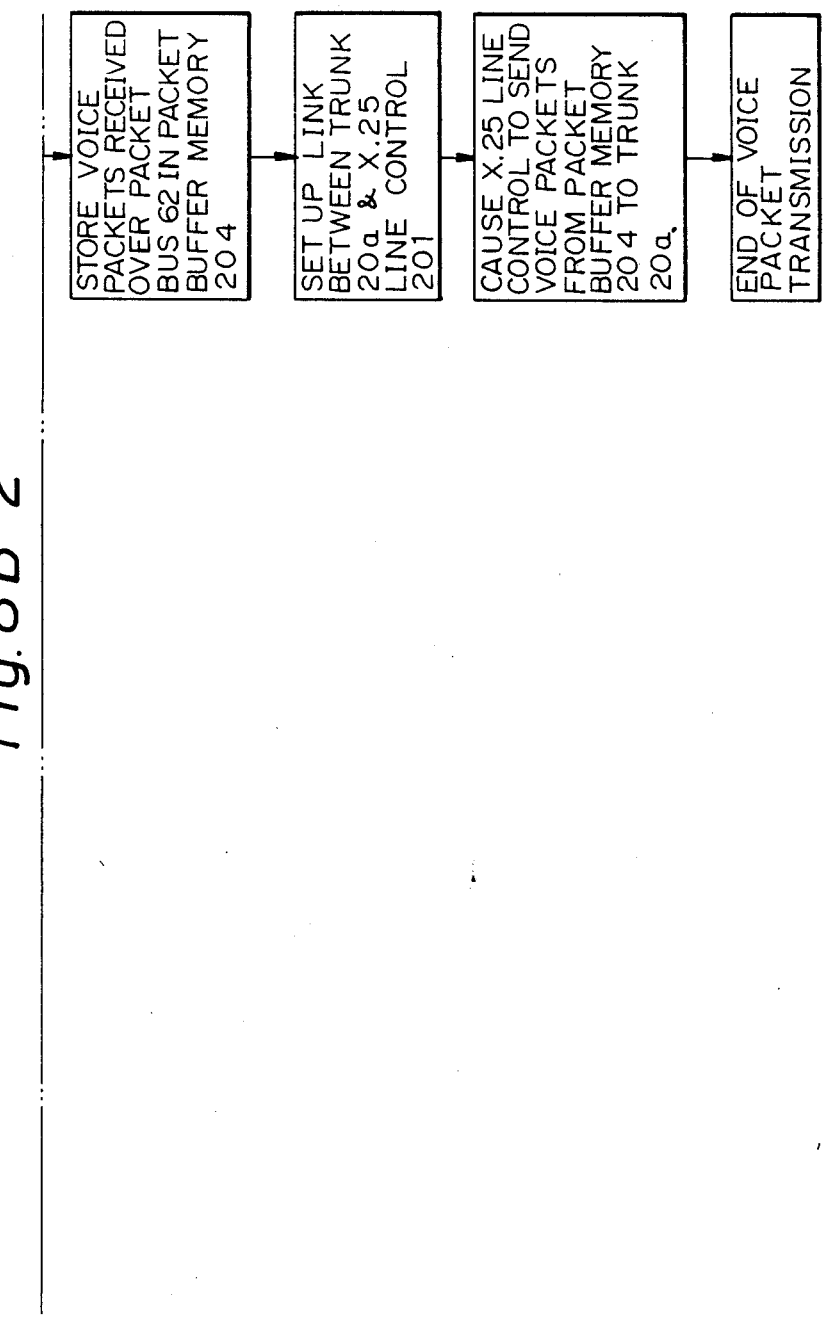

FIGS. 8A and 8B indicate a voice packet switching procedure for transmitting voice data received from a terminal (not shown), which is connected to the terminal line 10a, to the trunk 20a in the form of packets.

As shown in FIG. 2, when voice is received over the terminal line 10a, the B/D channel separation control unit 101 separates D channel call control data from the received data. Under the control of the main terminal line control section 107, the separated D channel call control data are sent out to the call control bus 61 via the D channel line control section 102 and call control bus interface control section 104. Consequently, the call control data are transferred to the call processing control unit 50. On recognizing the arrival of voice data at the terminal line control unit 10, the call processing control unit 50 selects a time slot to be used on the message bus 60 in order to interconnect the voice packet assembly/disassembly control unit 40 and the bus 60. Then, the control unit 50 informs the control units 10 and 40 of interest of the time slot number via the call control bus 61. Also, the control unit 50 selects the trunk control unit 20 to be connected to the control unit 40 and then reports it to the control units 10 and 40 via the call control bus 61.

The B/D channel separation control section 101 of the terminal line control unit 10 sends B channel voice received over the terminal line 10a to the message bus 60 via the message bus interface control section 103. The B channel voice is propagated through the bus 60 to the voice packet assembly/disassembly control unit 40. As shown in FIG. 5, in the control unit 40, the B channel voice is routed through a message bus interface control unit 401 and a synchronizing signal generating section 402 to a multiplex/demultiplex serial/parallel conversion control section 403. Subsequently, a voice signal received over the B channel of the terminal line 10a is stored in a voice packet buffer memory 406 under the control of a main control section 407. The received voice signal is assembled into packets, and packet headers are added to the individual voice packets. Then, the control unit 40 causes its packet bus interface control section 405 to transfer the voice packets from the memory 406 to the trunk control unit 20 which has been reported from the call processing control unit 50 via the packet bus 62. In response, the trunk control unit 20 stores the voice packets received over the packet bus 62 in the packet memory 204 via the packet interface control section 203 (see FIG. 3). The main trunk line control section 205 sets up a link between the trunk 20a and the X.25 line control section 201. Thereafter, the X.25 line control section 201 sends the voice packets to the trunk 20a.

A reference will be made to FIGS. 9A and 9B for describing a voice packet switching procedure which is executed in the contrary situation, i.e., when voice packets received over the trunk 20a are reconstructed into non-packet voice data and then transmitted to a terminal (not shown) connected to the terminal line 10a.

When voice packets are received over the trunk 20a shown in FIG. 3, the X.25 line control section 201 of the trunk control unit 20 stores the voice packets in the packet buffer memory 204. The main trunk control section 205 informs the call processing control unit 50 of the reception of voice packets via the call control bus 61. On recognizing the reception of the voice packets, the call processing control unit 50 selects the voice packet assembly/disassembly control unit 40 to be connected to the trunk control unit 20, and then it reports such selection to the control sections 20 and 40. Further, the control section 50 selects a time slot number to be used on the message bus 60 in order to interconnect the voice packet assembly/disassembly control section 40 and the terminal line control section 10. The number of the time slot thus selected is reported to the control sections 40 and 10 of interest over the call control bus 61. The trunk control section 20 sends the voice packets from the packet buffer memory 204 to the packet bus 62 via the packet bus interface control section 203. The voice packets are received by the voice packet assembly/disassembly control unit 40 and are stored in the voice packet buffer memory 406 via the packet bus interface control section 405. In response, the control section 40 removes the packet headers from the voice packets stored in the memory 406, thereby reproducing non-packet voice data. The multiplex/demultiplex serial/parallel conversion control section 403 multiplexes and serializes the non-packet voice data under the control of the main voice packet assembly/disassembly control section 407, while the synchronizing signal generating section 402 adds a synchronizing signal to the resulting serial voice data. Then, the voice data are transferred to the message bus interface control section 103 of the terminal line control unit 10 by way of the message bus interface control section 401 and message bus 61. The message bus interface control section 103 delivers the voice data to the B/D channel separation control section 101. Finally, the voice data are transmitted to the terminal (not shown) connected to the terminal line 10a over the B channel.

In summary, a packet switching system for a distributed processing ISDN switch in accordance with the present invention has various characteristic features as enumerated below.

(1) Packet assembly/disassembly control units are shared by all the terminal line control units which are installed in a switch. Heretofore, such control units have been allocated one-to-one to terminal control units, resulting in redundant functional distribution and inefficient use of the control units. The present invention is free from such drawbacks.

(2) The packet assembly/disassembly control units are each associated with respective ones of different media which the system can deal with. Although a prior art packet switching system assigns packet assembly/disassembly control units to individual terminal line control sections as stated above, such control units are used to handle data, voice, and other different types of media, and hence they cannot implement processing other than the processing common to the different media. More specifically, the prior art system cannot implement packet assembly/disassembly processing in matching relation to the characteristics of of a particular medium. The present invention is free from such a drawback also.

(3) The bus installed in the switch for the transfer of data is implemented as an exclusive packet bus for packet data transfer and an exclusive message bus for non-packet data transfer. It has been customary to execute packet assembly/disassembly processing in a terminal line control unit so as to packetize all of the non-packet data without exception. Hence, only a packet bus for packet data transfer has been available for data transfer in a switch. Such a prior art switching procedure is time-consuming and increases the transmission delay time. The present invention with the two independent buses cuts down the switching time and thereby the transmission delay time.

Various modifications will become possible for those skilled in the art after receiving the teachings of the present disclosure without departing from the scope thereof.

What is claimed is:

1. A packet switching system for a distributed process ISDN (Integrated Services Digital Network) switch comprising:
   a plurity of terminal line control units, each being connected to a respective one of a plurality of ISDN terminals for controlling a B channel and a D channel;
   a plurality of trunk control units for performing X.25 protocol control to connect said ISDN switch to another ISDN switch;
   a data packet assembly/disassembly control unit for assembling and disassembling data to be transmitted to any of the ISDN terminals and data received from any of the ISDN terminals;
   a voice packet assembly-disassembly control unit for assembling and disassembling voice to be transmitted to any of the ISDN terminals and voice received from any of the ISDN terminals;
   an internal bus interconnecting said terminal line control units, said trunk control units, and said data and voice packet assembly/disassembly control units for causing data and voice to be transferred, said internal bus including (i) a packet bus for transferring packetized data and voice between said data and voice packet assembly/disassembly control units and said trunk control units and (ii) a message bus for transferring non-packet data and voice between said data and voice packet assembly/disassembly control units and said terminal line control units, and for transferring packetized data from said data packet assembly/disassembly control unit to said terminal line control units;
   a call processing control unit for performing call processing call processing control in response to call control data received from any of the ISDN terminals; and
   a call control bus interconnecting said terminal line control units, said trunk control units, said data and voice packet assembly/disassembly control units, and said call processing control unit for causing the call control data to be transferred;
   wherein said data and voice packet assembly/disassembly control units are shared by said plurality of terminal line control units.

2. A packet switching system for a distributed processing Integrated Services Digital Network (ISDN) switch comprising:
   a message bus;
   a packet bus;
   a plurality of terminal line controllers connected to said message and packet busses and connectable to a plurality of terminals for communicating data and voice therebetween;
   a plurality of truck controllers connected to said message and packet buses and connectable to a plurality of other switching systems for communicating packets therebetween;
   a plurality of packet assembly/disassembly control units connected to said message and packet buses including (i) a data packet assembly/disassembly control unit having means for producing packet headers and for adding the packet headers to data to produce data packets and (ii) a voice packet assembly/disassembly control unit having means for producing packet headers and for adding the packet headers to voice to produce voice packets; and
   a call processing control unit connected to each of said buses and including:
   (a) means responsive to reception of data at a first one of said terminal line controllers for selecting a time slot on said message bus during which received data is transferred from said first terminal line controller to said data packet assembly/disassembly control unit over said message bus,
   (b) means for selecting a first one of said plurality of trunk controllers and for transferring data packets from said data packet assembly/disassembly control unit to said first trunk controller over said packet bus,
   (c) means responsive to reception of voice at said first terminal line controller for selecting a time slot on said message bus during which received voice is transferred from said first terminal line controller to said voice packet assembly/disassembly control unit over said message bus,
   (d) means for selecting said first trunk controller and for transferring voice packets from said voice packet assembly/disassembly control unit to said first trunk controller over said packet bus, and (e) means for selecting a second time slot on said message bus, for selecting a second one of said plurality of terminal line controllers, and for transferring data packets from said data packet assembly/disassembly control unit to said second terminal line controller via said message bus during the second time slot.

* * * * *

UNITED STATES PATENT AND TRADEMARK OFFICE
CERTIFICATE OF CORRECTION

PATENT NO. : 4,977,556

DATED : December 11, 1990

INVENTOR(S) : Akira Noguchi

It is certified that error appears in the above-identified patent and that said Letters Patent is hereby corrected as shown below:

Column 8, line 14, delete "call processing".

Signed and Sealed this

Ninth Day of June, 1992

Attest:

DOUGLAS B. COMER

*Attesting Officer*    Acting Commissioner of Patents and Trademarks